United States Patent
Wang et al.

(10) Patent No.: US 11,932,117 B2
(45) Date of Patent: Mar. 19, 2024

(54) SYSTEMS AND METHODS FOR SPEED CONTROL OF WHEELS OF A VEHICLE

(71) Applicant: Rivian IP Holdings, LLC, Plymouth, MI (US)

(72) Inventors: Kang Wang, Palos Verdes Estates, CA (US); Boru Wang, Torrance, CA (US); Chia-Chou Yeh, Torrance, CA (US); Brian Harries, Redondo Beach, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 157 days.

(21) Appl. No.: 17/223,403

(22) Filed: Apr. 6, 2021

(65) Prior Publication Data

US 2022/0314816 A1 Oct. 6, 2022

(51) Int. Cl.
| | |
|---|---|
| *B60L 15/20* | (2006.01) |
| *B60L 3/08* | (2006.01) |
| *B60L 3/10* | (2006.01) |
| *B60W 30/045* | (2012.01) |
| *B60W 30/18* | (2012.01) |
| *B60W 30/182* | (2020.01) |

(52) U.S. Cl.
CPC .............. *B60L 15/20* (2013.01); *B60L 3/08* (2013.01); *B60L 3/102* (2013.01); *B60W 30/045* (2013.01); *B60W 30/18172* (2013.01); *B60W 30/182* (2013.01); *B60L 2220/46* (2013.01); *B60L 2240/421* (2013.01); *B60L 2240/423* (2013.01); *B60L 2240/461* (2013.01); *B60L 2240/465* (2013.01); *B60L 2250/26* (2013.01); *B60L 2260/28* (2013.01)

(58) Field of Classification Search
None
See application file for complete search history.

(56) References Cited

U.S. PATENT DOCUMENTS

| | | | |
|---|---|---|---|
| 5,294,871 | A | 3/1994 | Imaseki |
| 7,735,845 | B2 | 6/2010 | Snow |
| 8,011,678 | B1 | 9/2011 | Bell et al. |
| 8,262,109 | B1 | 9/2012 | Bell et al. |
| 8,718,897 | B2 * | 5/2014 | Wright .................... B60L 15/32 701/91 |
| 8,950,520 | B2 | 2/2015 | Hauser et al. |

(Continued)

FOREIGN PATENT DOCUMENTS

| | | | |
|---|---|---|---|
| CN | 112757906 A * | 5/2021 | ............. B60L 15/20 |
| DE | 102011113909 A1 | 3/2012 | |

(Continued)

*Primary Examiner* — Todd Melton
(74) *Attorney, Agent, or Firm* — Haley Guiliano LLP

(57) ABSTRACT

Systems and methods are provided herein for controlling the speed on each wheel of a vehicle, possibly operating a vehicle in a speed control mode. In response to receiving input to engage speed control mode and receiving an accelerator pedal input, the system determines a target wheel speed based on the accelerator pedal input, monitors wheel speed of each of a plurality of wheels and determines, for each monitored wheel, a difference based on the monitored wheel speed and the target wheel speed. A torque is provided to each of the plurality of wheels based on the respective difference to achieve the target wheel speed.

19 Claims, 6 Drawing Sheets

(56) References Cited

U.S. PATENT DOCUMENTS

| | | | |
|---|---|---|---|
| 9,205,758 B2 * | 12/2015 | Cox | B64C 25/405 |
| 9,538,706 B2 | 1/2017 | Haun | |
| 9,950,640 B2 * | 4/2018 | Lai | B60L 50/10 |
| 11,584,225 B2 * | 2/2023 | Velazquez Alcantar | |
| | | | B60K 26/02 |
| 2002/0005304 A1 | 1/2002 | Bachman et al. | |
| 2012/0159916 A1 | 6/2012 | Ishii et al. | |
| 2013/0211678 A1 | 8/2013 | Lee et al. | |
| 2021/0206430 A1 * | 7/2021 | North | B62D 11/04 |
| 2021/0252976 A1 * | 8/2021 | Nahrwold | B60L 7/10 |
| 2021/0309114 A1 * | 10/2021 | Nordmann | B60K 6/52 |

FOREIGN PATENT DOCUMENTS

| | | |
|---|---|---|
| DE | 102012209788 A1 | 12/2013 |
| EP | 3511190 A1 | 7/2019 |
| JP | 2014183686 A | 9/2014 |
| WO | 2020075129 A1 | 4/2020 |

* cited by examiner

SYSTEMS AND METHODS FOR SPEED CONTROL OF WHEELS OF A VEHICLE

INTRODUCTION

Vehicles generally perform turns by allowing the driver to turn the front wheels of the vehicle. However, the radii of such turns are limited by the degree to which the wheels can be turned, which leads to difficulty to perform turns on narrower roads or paths. Further, in a vehicle, the gas pedal generally adjusts the output power of the engine, which can result in variable wheel speed based on the surface conditions (e.g., due to wheel slip), which can make it difficult to perform turns and to drive over terrain. Consequently, what is needed is better control of the vehicle for turning and for driving on uneven, variable, and different friction surfaces, among various other types of surfaces.

SUMMARY

It is advantageous to provide a speed control system to a vehicle to control the speed of each wheel based on an accelerator pedal input. In some embodiments, a speed control system is a system that operates with all wheels at the same wheel speed. In some embodiments, the speed control system correlates an accelerator pedal input to a target wheel speed. For example, a single accelerator pedal input may provide an appropriate torque to each wheel to achieve the target wheel speed. The torque provided to each wheel may vary based on uneven, variable, and different friction surfaces, such as, for example, driving on an uneven surface or an icy road to achieve the target wheel speed.

In one approach, the system determines a target wheel speed based on the accelerator pedal input and monitors the wheel speed of each wheel (e.g., at least two wheels) on the vehicle. In some embodiments, torque may be provided in proportion to the accelerator pedal input (e.g., proportionally to how far the user has pressed the accelerator pedal, proportionally to the extent the accelerator pedal is pressed to the floor board, among other possibilities contemplated herein) and a difference between the target wheel speed and the monitored wheel speed. In some embodiments, torque may be provided based on a lookup table to achieve the target wheel speed. Accordingly, the speed control system is able to better control each wheel of the vehicle on uneven, variable, and different friction surfaces by maintaining the target wheel speed.

Further, in this approach, the system determines if there is a difference between the target wheel speed and the monitored wheel speed. For example, when the front wheels are on a lower friction surface (e.g., loose dirt, gravel roads, wet pavement, snowy roads, among other terrains) the target wheel speed may be exceeded, however, when the rear wheels are on a higher friction surface (e.g., dry pavement, road surfaces, among other driven surfaces), the target wheel speed may not be met. In some embodiments, the system, in response to determining differences in monitored wheel speed and target wheel speed, adjusts the torque to each of the plurality of wheels such that a monitored wheel speed is closer to the target wheel speed.

In some embodiments, the speed control system determines that a wheel speed for one of the wheels of the vehicle exceeds the target wheel speed. In some embodiments, in response to determining that for one of the wheels the monitored wheel speed exceeds the target wheel speed, the system may reduce power to the electric motor for that wheel to reduce the wheel speed and better control each wheel of the vehicle.

Further, it is advantageous to provide speed control to wheels in a vehicle for better control of the wheels speed on the uneven, variable, unstable, and different surfaces. For example, the vehicle may be positioned on a surface that is uneven (e.g., inclined, declined, sloped to a side) and may be on surface with varying friction (e.g., surface with rain, snow, ice, dirt, pavement, gravel, wet surface). In accordance with the present disclosure, systems and methods are provided that improve control of the vehicle by employing a speed control mode. A speed control mode is a mode where the speed of each wheel is controlled and adjusted to match a target wheel speed. In some embodiments, methods and systems may utilize improved features of a vehicle (e.g., independent control of front and back driveshafts, independent control of each of the wheels, independent control of each of the brakes, etc.) to perform speed control at each wheel. Accordingly, the methods and systems may provide a vehicle with a capability of performing turns (in either direction) smoothly and under control around a point under the chassis of the vehicle while controlled driving over uneven or unstable surfaces with varying surface frictions using speed control at each wheel, enabling the vehicle to pivot in a circle with a minimal or zero turning radius. The zero radius turn is a turn that pivots the vehicle around a point under the vehicle.

In some implementations, the techniques described below may be performed by processing circuitry of a vehicle. The processing circuitry may be implemented as a part of a vehicle, integrated within the vehicle's electric circuitry, among other possibilities. In some embodiments, the processing circuitry may comprise an on-board vehicle computer that can control multiple features or capabilities of the vehicle. In some embodiments, the processing circuitry may be communicatively connected with user inputs of the vehicle, infotainment systems, sensors of the vehicle, and transitory or non-transitory memory (e.g., memory-storing institutions for operating the vehicle).

In some embodiments, the vehicle includes independent motors for each of the wheels. In some embodiments, the respective motors may include electric motors. For example, the vehicle may have four independent motors, one to control each of the wheels. In some embodiments, the processing circuitry may monitor the wheel speed of each of a plurality of wheels of the vehicle by monitoring signals from sensors coupled to motor shafts of the respective electric motors. In some embodiments, each sensor may indicate an amount of rotation of the respective motor shaft coupled to each of the plurality of wheels of the vehicle. In some embodiments, the processing circuitry, in response to monitoring the wheel speed, may calculate each wheel speed based on the respective signal. In some embodiments, the processing circuitry may calculate the wheel speed based on sensors coupled to the wheels.

In some embodiments, the processing circuitry may further determine that wheel speed of one of the plurality of wheels of the vehicle exceeds the target wheel speed.

Based on determining wheel speed of one of the plurality of wheels of the vehicle exceeds the target wheel speed, the processing circuitry may provide the torque in an opposite direction as the wheel is spinning to reduce the wheel speed. For example, as the vehicle is traversing on a hill, and one of the tires on the wheels suddenly breaks the grip with the ground and spins out in the forward direction, the processing circuitry may reduce the torque applied to the respective motor to reduce the wheel speed. In some embodiments, the processing circuitry may provide torque in the opposite direction (i.e., in this example backwards direction) to quickly slow down the spinning of the wheel.

In some embodiments, the processing circuitry may provide varying levels torque for each of the plurality of wheels with a reaction speed of less than 100 microseconds. In some embodiments, the processing circuitry may provide the varying levels of torque for each of the plurality of wheels with a reaction speed of less than 20 microseconds. For example, reaction speed includes the time for a signal to travel from the resolver to the processing circuitry, the time for the processing circuitry to process the signal, and the time to adjust the control (e.g., torque) of the motor. Specifically, as the motor is providing torque to the wheel, resolvers (i.e., sensors) monitor the signals of the motors to determine the wheel speed for each wheel and transmit this information to processing circuitry.

In some embodiments, a range of 0-100% of the accelerator pedal input corresponds to 0 mph (miles per hour) to a maximum wheel speed. In some embodiments, a maximum wheel speed in the speed control mode is less than 30 mph. In another embodiment, a maximum wheel speed in the speed control mode is adjusted based on the surface friction that the vehicle is on. For example, if the vehicle is on uneven surface, the maximum wheel speed may be adjusted based on which direction the vehicle is traveling. If the vehicle is traveling down a hill, the maximum wheel speed may be lower to avoid a runaway vehicle. On the other hand, if the vehicle is traveling up a hill, the maximum wheel speed may be higher to overcome the gravitational forces.

In some embodiments, the processing circuitry may provide the torque to each of the plurality of wheels to achieve the target wheel speed by providing an open-loop forward torque to wheels on a first side of the vehicle and by providing an open-loop backward torque to wheels on a second side of the vehicle. For example, the processing circuitry may concurrently provide forward torque to wheels on the first side of the vehicle and provide backward torque to wheels on the second side of the vehicle (e.g., to perform vehicle yaw). In some embodiments, the second side is opposite to the first side. For example, to perform smooth vehicle yaw, the vehicle provides forward torque to wheels on one side of the vehicle and backward torque to wheels on the other side of the vehicle. In some embodiments, the processing circuitry may provide an open-loop forward torque to both sides of the vehicle.

In some embodiments, while employing the wheel speed control, the processing circuitry may further engage a vehicle yaw mode, possibly with various other types of modes as well. In some embodiments, the processing circuitry, while operating in the vehicle yaw mode, may provide an open-loop torque to a plurality of wheels of the vehicle. Further, in some embodiments, the processing circuitry may identify slippage of the plurality of wheels of the vehicle, and in response, may provide a closed-loop torque to the plurality of wheels of the vehicle.

In some embodiments, the speed control mode is automatically engaged in response to one or more wheels of the plurality of wheels of the vehicle spinning. For example, as the vehicle goes over a large rock or boulder and one of the wheels becomes airborne, the processing circuitry may automatically engage the speed control mode without any user inputs.

In some embodiments, the plurality of wheels may include four wheels. In some embodiments, the vehicle may include four electric motors, each configured to provide independent and varying levels of torque to each wheel, e.g., a respective one of the four wheels.

In some embodiments, the processing circuitry may engage the speed control mode after a number of criteria checks are performed (e.g., wheel alignment, drive mode, vehicle speed, periphery checks, geo-fencing, vehicle health, etc.). For example, the processing circuitry may determine that the vehicle is stationary (or nearly stationary) with all the wheels straight relative to a vertical axis of the vehicle, e.g., a vertical axis through the center of gravity of the vehicle and perpendicular to one or more ground surfaces. In some embodiments, the speed control mode may only be activated when all wheels of the vehicle are straight (e.g., aligned to be parallel to the length of the vehicle). In some embodiments, the speed control mode may be activated when the front wheels of the vehicle are below a turn threshold (e.g., less than 10 degrees from being aligned to be parallel to the length of the vehicle). In some embodiments, the speed control mode may be activated automatically by the vehicle without one or more user inputs. In yet another embodiment, the speed control mode may be activated with a button, a turn lever, a paddle shifter or via voice command using voice control or any other method or a combination thereof. In some embodiments, when the criteria checks are met, the processing circuitry may initiate the speed control mode. In some embodiments, the inputs for engagement of the speed control mode may be received via a graphical user interface on a vehicle display. In some embodiments, the inputs may be received via buttons. In some embodiments, the speed control mode may be activated based on varying surface friction at the wheels. For example, the vehicle's front wheels may be positioned on a low friction surface and the rear wheels may be positioned on a high friction surface. The surface friction may be determined based on the amount of torque applied to each wheel for the wheel to break traction between the wheel and the ground. In some embodiments, the speed control mode may be activated while the vehicle is moving.

In some embodiments, the processing circuitry may be configured to disengage the speed control mode. For example, the processing circuitry may determine that an obstruction may exist or any other criteria are not satisfied. In some embodiments, when the determination is made, the processing circuitry may automatically disengage the speed control mode. In some embodiments, the processing circuitry may disengage the speed control mode in response to receiving user input (e.g., a key is pressed, or the steering wheel is turned to a position that exceeds a threshold or the vehicle speed exceeds a speed threshold).

In some embodiments, the processing circuitry may compare the rotation of the first side front wheel, rotation of the second side rear wheel, rotation of the first side rear wheel, and the rotation of the second side front wheel to a target spin rate (e.g., 4 revolutions per second spin rate or any other spin rate). The target spin rate may correlate to the target wheel speed and vice versa. For example, the processing circuitry may control the rotation of each of the four wheels based on respective comparisons to the target spin rate. In some embodiments, the processing circuitry may provide torque in the opposite direction as the wheel spinning. In some embodiments, the processing circuitry may apply a brake to one or more of the first side wheels and the second side wheels. In some embodiments, the processing circuitry may reduce forward torque to one or more of the first side wheels or backward torque to the second side wheels. In some embodiments, the torque provided to all wheels is in the same direction.

According to another embodiment, a vehicle configured for performing wheel speed control is provided. In some embodiments, the vehicle may include a plurality of wheels. In some embodiments, the plurality of wheels may include four wheels. In some embodiments, the four wheels may include two front wheels and two rear wheels, and each wheel of the front wheels and rear wheels may be configured with a motor to provide torque to each respective wheel. In some embodiments, the motor configured to provide torque may be an electric motor.

In some embodiments, each wheel may be configured with a motor including a first motor configured to transmit torque to an outer front wheel, a second motor configured to transmit torque to an inner front wheel, a third motor configured to transmit torque to an outer rear wheel and a fourth motor configured to transmit torque to an inner rear wheel.

In some embodiments, a non-transitory computer-readable medium having instructions encoded thereon for performing speed control of wheels of a vehicle is provided. In some embodiments, the encoded instructions may be executed by processing circuitry of a vehicle having front wheels and rear wheels.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

The present disclosure is directed to operating a vehicle in a speed control mode. In speed control mode, the vehicle's wheels are operated at a target wheel speed for better control of the vehicle on uneven and different friction surfaces when using two or more motors. In some embodiments, the vehicle includes a normal turning mode where the vehicle is steered by changing the angle of the front wheels relative to a vertical axis (e.g., each relative to a respective vertical 170 of FIG. 1) as well as a vehicle yaw mode where the electric vehicle is rotated about a point under the chassis of the vehicle, enabling the vehicle to pivot in a circle with a zero or minimal turning radius. Each of these modes may benefit from additional control over each wheel for improved operation. In some embodiments, the vehicle is configured to operate one or more modes in the vehicle at the same time. The vehicle yaw mode allows a vehicle to pivot around a point under the chassis of the vehicle. Yet, it should be noted that one or more vehicles may pivot under the chassis without the one or more modes of operation described herein. In some instances, the vehicles may perform one or more pivots without any modes selected or engaged. Yet, for purposes of illustration and describing examples without limiting this disclosure, the vehicle capabilities described to pivot around a point, turn with a reduced or minimal turning radius, initiate forward torque to one or more wheels while initiating backwards torque to one or more other wheels, among other examples, may be performed in a normal driving mode, a vehicle yaw mode, speed control mode while operating an closed-loop, an open-loop, and/or a combination of the modes, among other vehicle modes. Yet, these vehicles may perform these operations under multiple modes simultaneously, sequentially, and/or any combination thereof.

Figure 7:
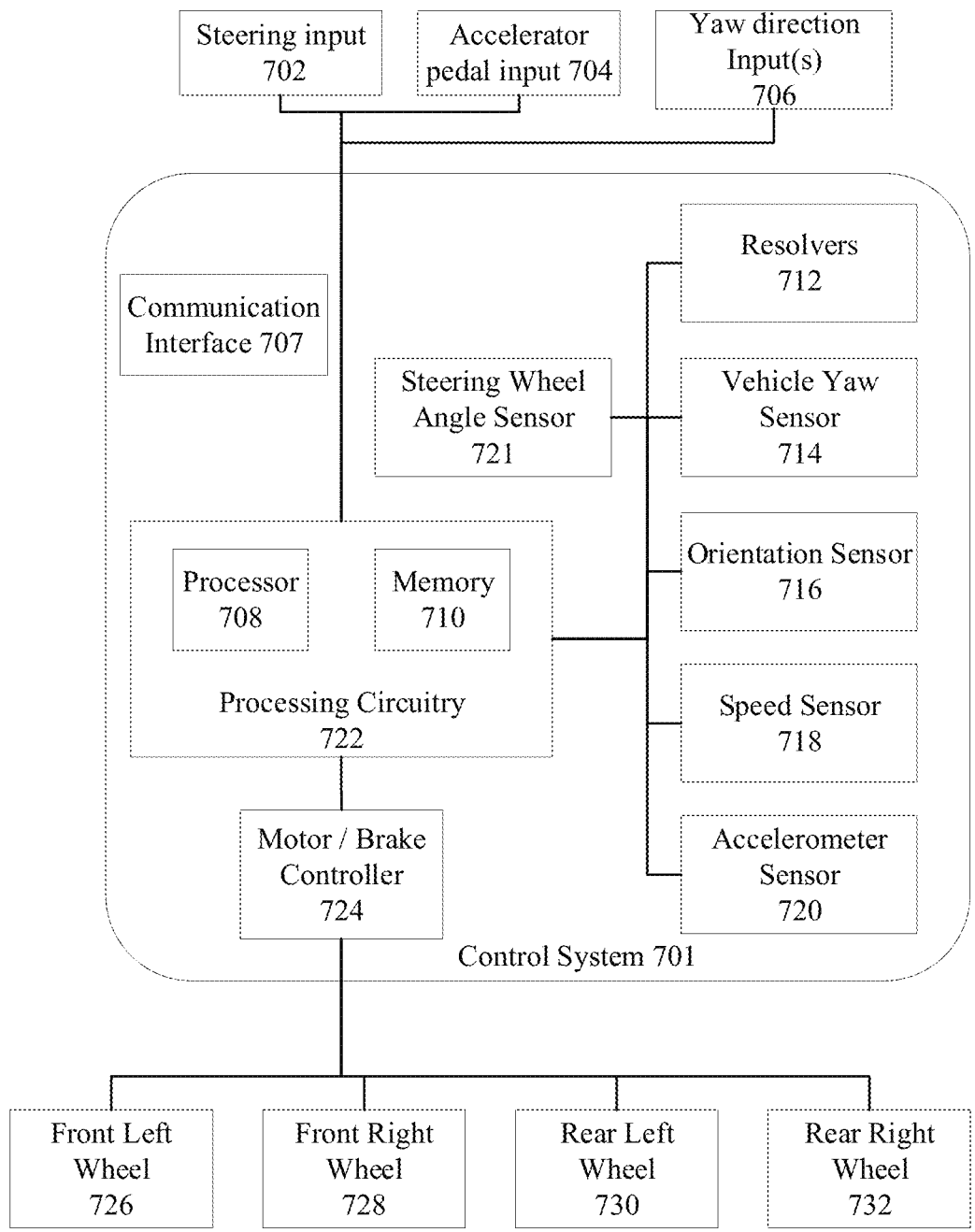
FIG. 7 depicts a system diagram of an illustrative system including processing circuitry, inputs variables, sensors and output variables, in accordance with some embodiments of the present disclosure.

In some embodiments, the present disclosure employs, in reference to FIG. 7, a control system 701 that receives input variables 702-706 and transmits output variables 726-732. The control systems 701 includes a communication interface 707, a processing circuitry 722, sensors 712-720, and motor and brake controller 724. The illustrative processing circuitry 722 includes processor 708 and memory 710. In an illustrative example, the control system 701 may be used for speed control of wheels of the vehicle (e.g., for better control on uneven, variable, and different friction surfaces when using two or more motors). The system and its components will be described in more detail below.

Figure 1:
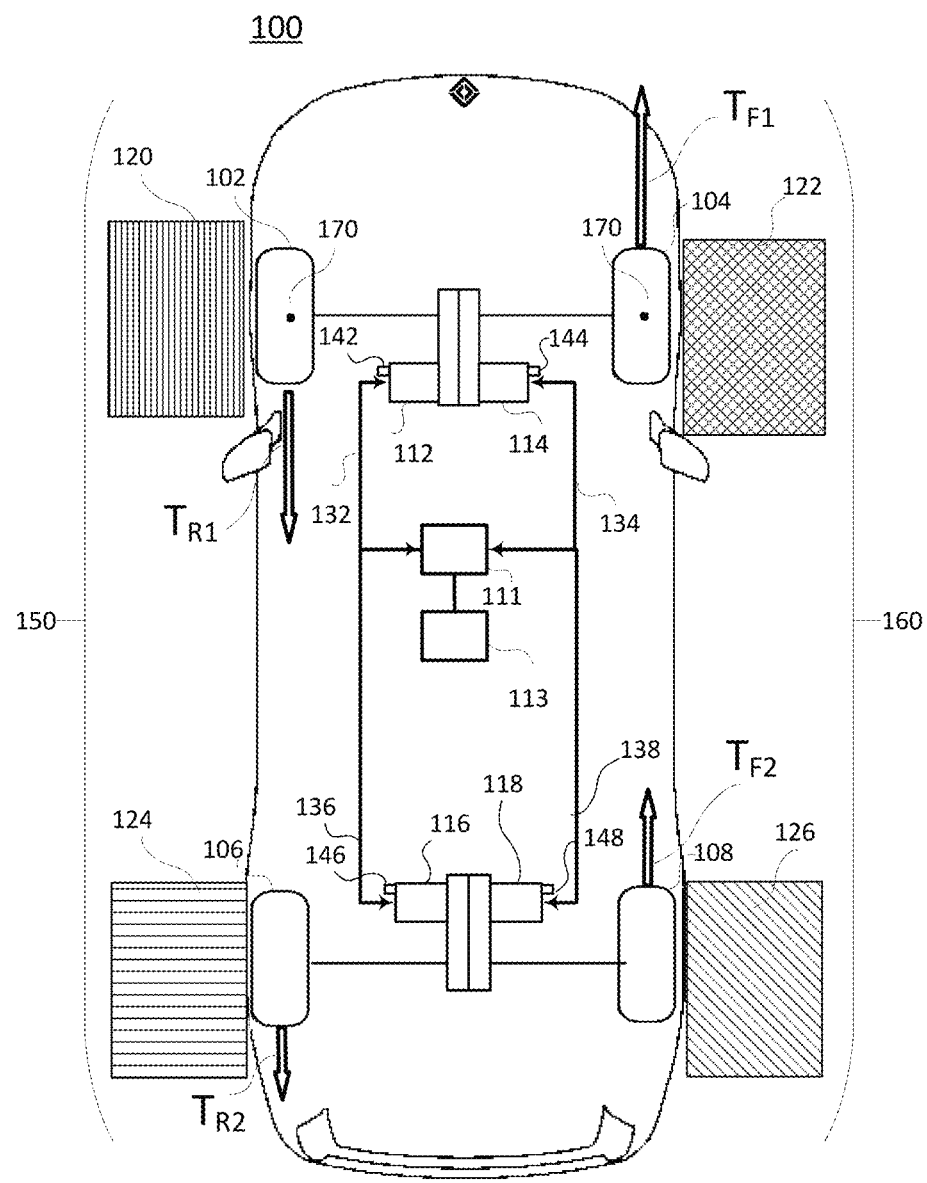
FIG. 1 shows a top cross-sectional view of an illustrative vehicle in accordance with some embodiments of the present disclosure.

In some embodiments, in reference to FIG. 1, the torque of each wheel 102, 104, 106, 108 of the vehicle 100 may be independently controlled. In some embodiments, the torque of each wheel of the vehicle may be provided in proportion to the accelerator pedal input (e.g., proportionally to how far the user has pressed the accelerator pedal 113, the accelerator pedal is pressed to its maximum extent, the accelerated pedal is pressed to the floor board, among other possibilities contemplated herein) and the surface friction at each wheel 102, 104, 106, 108. In some embodiments, the vehicle 100 may be configured, when certain conditions are met (e.g., when the speed of the vehicle is low enough and/or when the front wheels are aligned parallel to the direction of the vehicle), to operate in the speed control mode. In some embodiments, the vehicle 100 is configured to receive inputs from the user via a graphical user interface to engage a speed control mode. In some embodiments, the vehicle is configured to receive additional inputs, for example, type of road (e.g., pavement, sand, ice, wet, gravel) and the maximum wheel speed while operating in the speed control mode. For example, the maximum wheel speed for each wheel may be set to 30 mph, 20 mph, 10 mph, or any value that is listed in a lookup table for the type of surface the vehicle is on. In some embodiments, while operating in the speed control mode, the system receives an accelerator pedal input. In some embodiments, the vehicle's processing circuitry 722 determines, based on the accelerator pedal input, a target wheel speed for the wheels of the vehicle. For example, the target wheel speed for each wheel may be 30 mph, 20 mph, or 10 mph. In some embodiments, the processing circuitry may monitor the wheel speed for each wheel. In some embodiments, the processing circuitry may determine a difference based on the monitored wheel speed and the target wheel speed. In some embodiments, the processing circuitry may provide torque to each of the plurality of wheels based on the respective difference to modify the monitored wheel speed.

As referred to herein, the term "speed control mode" refers to any kind of mode, a mode triggered/entered automatically without user input, or technique for operating a vehicle such that torque provided to each of the wheels achieves a target wheel speed as determined from an accelerator pedal input. In some embodiments, the target wheel speed may be proportional to the accelerator pedal input. For example, the accelerator pedal input of 50% percent corresponds to a target wheel speed of 15 mph when a maximum wheel speed is 30 mph. In some embodiments, the maximum wheel speed in the speed control mode may be adjusted. Based on the accelerator pedal being pressed 50% percent, each wheel receives torque to achieve the 15-mph target wheel speed. For example, a wheel that is on a slippery ground (e.g., wet surface, icy surface) may reach 15 mph with very little torque applied. On the other hand, a wheel that is on higher friction ground (e.g., gravel surface, pavement) may require higher torque to achieve 15 mph. In another embodiment, the target wheel speed may be based on different user inputs. For example, the user may input the target wheel speed with a button, a turn lever, a paddle shifter or via voice command using voice control or any other method or a combination thereof.

As referred to herein, the term "vehicle yaw mode" refers to any kind of mode, a mode triggered automatically without user input, or technique for operating a vehicle such that outer and inner wheels of the vehicle are provided with torques in opposite directions. The term "outer" refers to the wheels on the side of the vehicle that are provided with forward torque and the term "inner" refers to the wheels on the side of the vehicle on which the wheels are provided with backward torque. Accordingly, which wheels of the vehicle are considered the outer and inner wheels will depend on the direction of yaw. In some embodiments, the vehicle yaw mode includes independent torque control of each wheel which is correlated to a wheel speed at each wheel. For example, the outer wheels of the vehicle are operated with forward torques and the inner wheels of the vehicle are operated with backward torque. In some embodiments, as a vehicle moves between surfaces that change in friction, the processing circuitry 722 adjusts the torque to each wheel based on the monitored wheel speed and the target wheel speed. In some embodiments, the vehicle yaw mode includes independently controlling each wheel to induce a yawing of the vehicle. For example, the outer front wheel of the vehicle is operated with a first forward torque, the outer rear wheel is operated with a second forward torque, the inner front wheel of the vehicle is operated with a first backward torque and the inner rear wheel is operated with a second backward torque. In some embodiments, the inner wheel is referred to as the first side, and the outer wheel is referred to as the second side.

FIG. 1 shows a top-down cross-sectional view of an illustrative vehicle 100 in accordance with some embodiments of the present disclosure. In some embodiments, vehicle 100 may be a coupe, a sedan, a truck, a sport utility vehicle, a delivery van, a bus, or any other type of vehicle.

In some embodiments, vehicle 100 may include a front left wheel 102, front right wheel 104, rear left wheel 106, and rear right wheel 108. In some embodiments, vehicle 100 may include a motor 112. Motor 112 may be connected to front left wheel 102 (e.g., via a belt, chains, gears, or any other connection device). Vehicle 100 may also include motors 114, 116, 118, which are similarly connected to wheels 104, 106, 108, respectively. In some embodiments, motors 112, 114, 116, and 118 may be configured to provide forward torque or backward torque to their respective wheels 102, 104, 106, and 108. In some embodiments, vehicle 100 may include an accelerator pedal 113 configured to provide an accelerator pedal input to a vehicle dynamic controller 111 configured to convert the accelerator pedal input to a target wheel speed. In some embodiments, vehicle 100 may include a resolver 142 attached at motor 112 and configured to monitor and send a signal from the resolver 142 to the vehicle dynamic controller 111. Further, the vehicle dynamic controller 111 communicates with each resolver 142, 144, 146, 148 coupled at each motor (112, 114, 116, 118) via the respective communications lines (132, 134, 136, 138).

In some embodiments, motors 112, 114, 116, and 118 may be any kind of motors capable of generating power (e.g., gas motors, gas-electric hybrids motors, electric motors, battery-powered electric motors, hydrogen fuel cell motors). In some embodiments, motors 112, 114, 116, and 118 may be battery-powered electric motors configured for vehicle drive, propulsion, by utilizing a plurality of battery cells packaged together to create one or more battery modules or assemblies to store energy and release the energy upon request. In some embodiments, motors 112, 114, 116, and 118 may be devices connected to a primary single motor (not shown) and configured to independently transfer power from a single motor to wheels 102, 104, 106, and 108, respectively. For example, motors 112, 114, 116, and 118 may independently transfer power to wheels 102, 104, 106, and 108, respectively, such that wheels 104 and 108 spin in one direction (e.g., forward direction) and wheels 102 and 106 spin in an opposite direction (e.g., backward direction), thereby enabling vehicle 100 to establish a zero-degree turning radius (i.e., vehicle yawing via vehicle yaw mode). In some embodiments, a vehicle yaw mode includes independently controlling each wheel to induce a yawing of the vehicle. For example, in a vehicle yaw mode, motors 112 and 116 may be configured to provide forward torque to their wheels 102 and 106, respectively and motors 114 and 118 may be configured to provide backward torque to their wheels 104 and 108. In some embodiments, wheels 104 and 108 may spin with a 500 rpm in a one direction/clockwise (e.g., forward direction) and wheels 102 and 106 spin in the opposite direction/counterclockwise direction (e.g., backward direction), thereby enabling vehicle 100 to perform a smooth turn.

In some embodiments, vehicle 100 may include processing circuitry 722. In some embodiments, the processing circuitry may include an on-board vehicle computer that is capable of controlling multiple features or capabilities of the vehicles. In some embodiments, processing circuitry may be communicatively connected with user inputs (e.g., graphical user interface) of the vehicle 100, sensors of the vehicle, and transitory or non-transitory memory (e.g., memory that stores instructions for operating the vehicle).

In some embodiments, vehicle 100 may include a plurality of sensors. For example, some of the plurality of sensors may include sensors for determining the speed of vehicle 100, the degree to which the front wheels 102, 104 of vehicle 100 are turned, vehicle rotation sensor to determine the rotation of the vehicle in a vehicle yaw mode, wheel rotation sensors (e.g., resolvers 142, 144, 146, 148) to determine the wheel speed of each of the wheels 102, 104, 106, and 108 of vehicle 100, and accelerometer sensor.

In some embodiments, the processing circuitry of vehicle 100 may be capable of directly controlling features of vehicle 100 with or without user input. In one example, processing circuitry may be able to actuate motor 112 to provide a specified amount of backward or forward torque to front left wheel 102 to achieve a target wheel speed. Similarly, processing circuitry may be able to actuate any of motors 114, 116, 118 to provide a specified amount of backward or forward torque to wheels 104, 106, 108, respectively, to achieve a target wheel speed.

In some embodiments, front left wheel 102 and front right wheel 104 may be connected via a drive shaft (not shown). As shown in FIG. 1, the illustrated vehicle is positioned with each of the wheels on a different ground having different surface friction. For example, ground 120 is under the front left wheel 102, ground 122 is under the front right wheel 104, ground 124 is under the rear left wheel 106, and ground 126 is under the rear right wheel 108. As shown, ground 120, 122, 124, and 126 may be varying and/or different ground surfaces including but not limited to road surfaces with or without gravel, rocks, boulders, rain, and snow, among other possibilities contemplated herein. FIG. 1 depicts a vehicle 100 performing a vehicle yaw with the left wheels 102 and 106 receiving backward torque and the right wheels 104 and 108 receiving forward torque. However, those skilled in the art will recognize that similar techniques can be used to perform any turn or motion including all wheels receiving torque in the same direction.

In some embodiments, when making a left yaw, vehicle 100 may provide backward torques ($T_{R1}$ and $T_{R2}$), based on the friction on the ground to achieve the target wheel speed, to the left wheels (e.g., front left wheel 102 and rear left wheel 106). In some embodiments, the vehicle may provide forward torques ($T_{F1}$ and $T_{F2}$) based on the friction on the ground to achieve the target wheel speed (e.g., target wheel speed is proportional to the accelerator pedal input) to the right wheels (e.g., front right wheel 104 and rear right wheel 108). For example, the vehicle 100 may provide forward torque $T_{F1}$ to the front right wheel 104 and may further provide forward torque $T_{F2}$ to the rear right wheel 108. In some embodiments, the vehicle 100 may provide backward torques ($T_{R1}$ and $T_{R2}$) based on the friction on the ground to achieve the target wheel speed (i.e., target wheel speed is proportional to the accelerator pedal input) to the left wheels (e.g., front left wheel 102 and rear left wheel 106). For example, vehicle 100 may provide backward torque $T_{R1}$ to the front left wheel 102 and may further provide backward torque $T_{R2}$ to the rear left wheel 106. Each of the forward torques $T_{F1}$ and $T_{F2}$, backward torques $T_{R1}$ and $T_{R2}$ are independent torques and are a function of the respective wheel speed. For example, a front right wheel 104 is on high friction ground 122 (e.g., pavement, gravel) and, as a result, requires higher torque $T_{F1}$ than torque $T_{F2}$ for the rear right wheel 108, which is on low friction ground 126 (e.g., icy road, sand, wet road).

In some embodiments, on a relatively consistent ground surface, the torque applied to each wheel 102, 104, 106, and 108 to achieve the target wheel speed should be substantially similar, approximately the same, substantially the same, among other possibilities contemplated herein. In another embodiment, on a relatively consistent ground surface, vehicle 100 may consider the payload in vehicle 100 to provide the torque to the wheels 102, 104, 106, and 108. For example, if vehicle 100 is carrying heavy material in the rear of vehicle 100, the torque applied to each wheel 102, 104, 106, and 108 to achieve the target wheel speed will vary based on the payload. In some embodiments, sensors 712-721 on the vehicle 100 suspension may transmit a signal to the vehicle dynamic control regarding the weight at each wheel. Based on the weight at each wheel 102, 104, 106, and 108, the processing circuitry 722 may adjust the torque to each wheel 102, 104, 106, and 108 to achieve the target wheel speed. Specifically, the torque to the rear wheels 106 and 108 may be higher to overcome the extra payload.

In some embodiments, the speed control mode can be used in any vehicle 100 capable of distributing torque, which can include braking, and monitoring wheel speed of each wheel 102, 104, 106, and 108. For example, the vehicle 100 may provide for independent distribution of torque to the right wheels 104 and 108 and the left wheels 102 and 106. According to another example, vehicle 100 may provide for the independent distribution of torque and braking to the left wheels 102 and 106 and the right wheels 104 and 108. According to another example, vehicle 100 may provide for the independent distribution of torque and braking to the left front wheel 102, the rear left wheel 106, the front right wheel 104 and the rear right wheel 108. The foregoing enables a driver to have accurate control of the center of rotation (e.g., zero-radius turn) while also performing the rotation smoothly.

The foregoing FIG. 1 is merely illustrative of the principles of this disclosure, and various modifications may be made by those skilled in the art without departing from the scope of this disclosure. The above-described embodiments are presented for purposes of illustration and not of limitation. For example, any combination of motors 112, 114, 116, and 118 and drivetrains may be used in vehicle 100 in accordance with the present disclosure. In some examples, the rear motors 116 and 118 of FIG. 1 may be used in combination with a single front motor 112. According to such a configuration, vehicle 100 includes three motors (one front motor and two rear motors). In another example, a single rear motor 116 may be used in combination with the two front motors 112 and 114 of FIG. 1. According to such a configuration, vehicle 100 includes three motors (two front motors and one rear motor).

In some embodiments, a method for controlling a vehicle 100 may include determining a target wheel speed for each of one or more wheels of the vehicle 100. In some embodiments, vehicle 100 has two wheels or three wheels or four wheels. Based on the number of wheels a vehicle 100 has, the method determines a wheel speed target for each wheel based on an accelerator pedal input. For example, the processing circuitry 722 detects an actual wheel speed for each of the one or more wheels 102, 104, 106, 108 which are controlled by one or more independent motors 112, 114, 116, 118 respectively. In some embodiments, the processing circuitry may determine one or more target torques for each of the one or more wheels based at least on the actual wheel speed and the target wheel speed for each of the wheel. For such an example, each of the target wheel speeds is configured with a target torque. The target torques may be adjusted by one or more independent motors 112, 114, 116, 118 to achieve one or more target torques.

Figure 2:
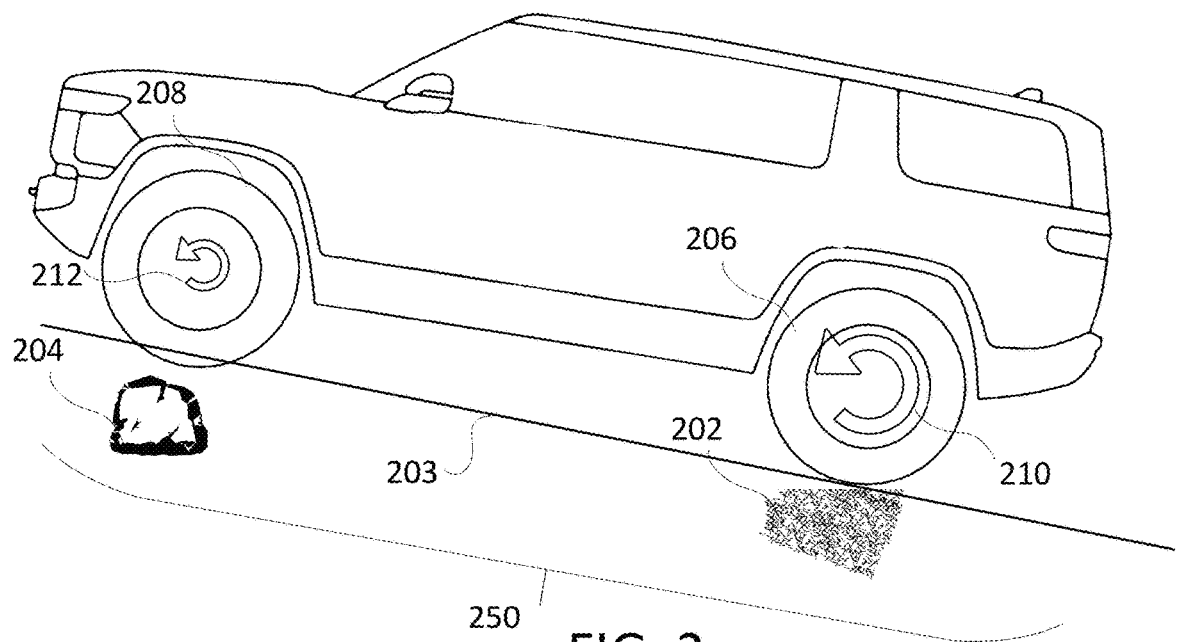
FIG. 2 shows a side view of an illustrative vehicle on an incline with varying surface friction in accordance with some embodiments of the present disclosure.

FIG. 2 shows a side view of an illustrative vehicle 200 on an uneven surface 203 (e.g., incline, decline, bank, or a combination thereof) with varying surface friction in accordance with some embodiments of the present disclosure. In some embodiments, vehicle 200 may be a coupe, a sedan, a truck, a sport utility vehicle, a delivery van, a full-size van, a minivan, a bus, or any other type of vehicle.

In some embodiments, the processing circuitry 722 may further monitor an incline of the vehicle based on a tilt sensor. For example, the vehicle may be in an incline position, a banked position, or a combination thereof. In some embodiments, the inclined position includes front wheels of the vehicle being in a higher position than rear wheels or the rear wheels of the vehicle being in the higher position than the front wheels. For example, the vehicle being on a hill with a front of the vehicle being higher than a rear of the vehicle. Alternatively, the vehicle may be on the incline, with the rear of the vehicle being higher than the front of the vehicle. In some embodiments, the banked position includes outer wheels (e.g., first side) of the vehicle being in the higher position than the inner wheels (e.g., second side) or the inner wheels (e.g., second side) of the vehicle being in the higher position than the outer wheel (e.g., first side). For example, the vehicle being on a hill sideways, with an inner side of the vehicle being higher than the outer side of the vehicle. Alternatively, with an outer side of the vehicle being higher that the inner side of the vehicle. In some embodiments, the processing circuitry may compare the incline of the vehicle against a vehicle incline threshold (e.g., 10% incline grade, 8% incline grade, etc.). The processing circuitry, in response to determining that the vehicle incline is below the vehicle incline threshold, may initiate a vehicle yaw mode or a speed control mode.

In some embodiments, vehicle 200 may include front left wheel 208, front right wheel (not shown), rear left wheel 206 and rear right wheel (not shown). In some embodiments, the vehicle may be on an uneven surface 203. In some embodiments, the vehicle may be on an uneven surface 203 with different friction surfaces (202 and 204) on the ground. In some embodiments, the different friction surfaces may include a lower friction surface 202 and a higher friction surface 204. In some embodiments, based on the different friction surfaces (202 and 204) and the uneven surface 203 the vehicle is positioned on, the vehicle may provide individual torque to each of the wheels (206 and 208) as well as rear right wheel (not shown) and front right wheel (not shown) for the wheels to achieve the target wheel speed. For example, as the vehicle is positioned on uneven surface 203 (e.g., incline), the torque 212 applied to each of the front left wheel 208 and front right wheel (not shown) is lower to account for the incline than the torque 210 applied to the rear left wheel 206 and rear right wheel (not shown). Specifically, as the vehicle's front is raised because of the uneven surface 203 (e.g., incline), the vehicle's weight is redistributed over the wheels 206 and 208, with more weight placed on the rear left wheel 206 and rear right wheel (not shown) because of the incline. In some embodiments, as a result of the uneven surface 203 (e.g., incline), the torque applied to each of the rear wheel 206 and rear right wheel (not shown) is greater than the torque applied to the front wheels 208 and front right wheel (not shown). For illustrative purposes, the size of the arrow 210 and 212 is indicative of the amount of torque applied (i.e., a larger arrow indicates higher torque, and a smaller arrow indicates a lower torque).

Figure 3:
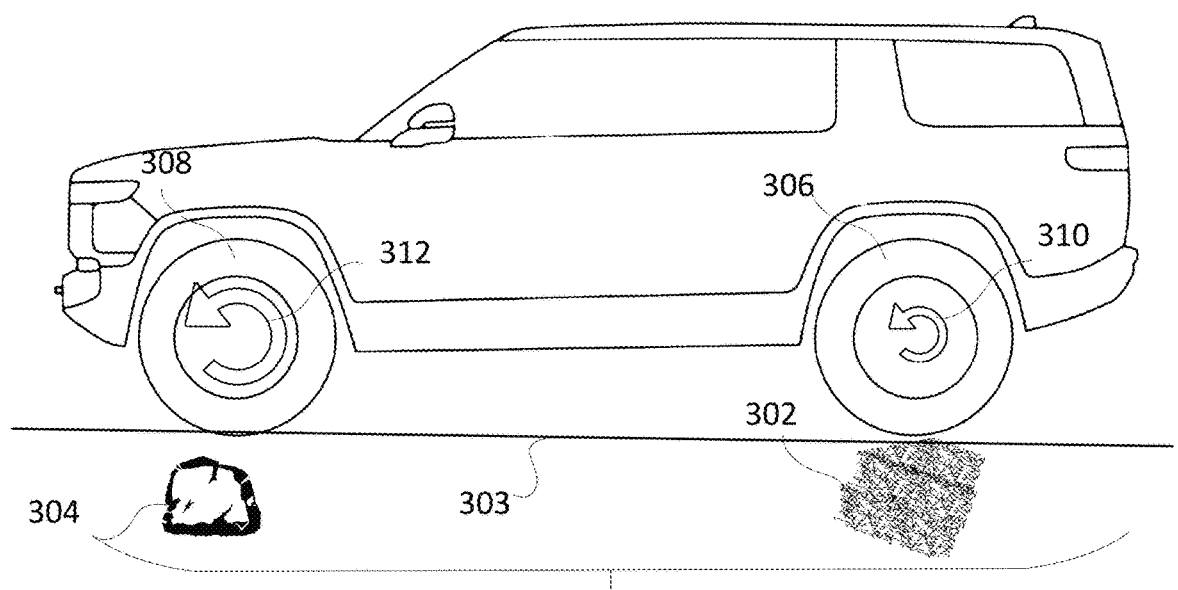
FIG. 3 shows a side view of an illustrative vehicle with varying surface frictions in accordance with some embodiments of the present disclosure.

FIG. 3 shows a side view of an illustrative vehicle 300 with varying surface frictions in accordance with some embodiments of the present disclosure. In some embodiments, vehicle 300 may be a coupe, a sedan, a truck, a sport utility vehicle, a delivery van, a bus, or any other type of vehicle, such as vehicle 100 described above for FIG. 1 and vehicle 200 described above for FIG. 2.

In some embodiments, vehicle 300 may include front left wheel 308, front right wheel (not shown), rear left wheel 306 and rear right wheel (not shown). In some embodiments, the vehicle 300 is on an even surface 303 (e.g., flat or approximately flat, substantially flat) with different friction surfaces on the ground. In some embodiments, the different friction surfaces include a lower friction surface 302 and a higher friction surface 304. In some embodiments, based on the different friction surfaces 302 and 304 on the ground, the vehicle 300 may provide torques 310 and 312 to each of the wheels, front left wheel 308, front right wheel (not shown), rear left wheel 306 and rear right wheel (not shown), for the wheels to achieve the target wheel speed. In some embodiments, vehicle 300 may provide independent torque to each wheel 306 and 308 on vehicle 300. For example, as vehicle 300 is positioned on even surface 303 with different surface frictions 302 and 304, the torques 310 and 312 applied to each of the front left wheel 308, front right wheel (not shown), rear left wheel 306 and rear right wheel (not shown), is proportional to the friction surface. Specifically, as friction under each wheel 306, 308 increases (e.g., the wheel moves from wet pavement to dry pavement), the amount of torque required for wheels 306, 308 to maintain the target wheel speed may increase. Similarly, as friction under each wheel 306, 308 decreases (e.g., the wheel moves from wet pavement to ice), the amount of torque required for wheels 306, 308 to maintain the target wheel speed may decrease. In some embodiments, when the wheel speed for wheel 308 is higher than the target wheel speed, vehicle 300 may apply a brake to wheel 308 or provide torque in the opposite direction or may reduce power to wheel 308, among other possibilities contemplated herein. Similarly, when the wheel speed for wheel 306 is higher than the target wheel speed, vehicle 300 may apply a brake to wheel 306 or provide torque in the opposite direction or may reduce power to the wheel, among other possibilities contemplated herein. In some embodiments, as a result of the different friction surfaces 302 and 304, the torque applied to the rear left wheel 306 may be less than the torque applied to the front left wheel 308. For illustrative purposes, the size of the arrow 310 and 312 is indicative of the amount of torque applied (i.e., a larger arrow 312 indicates higher torque, and a smaller arrow 310 indicates a lower torque).

Figure 4:
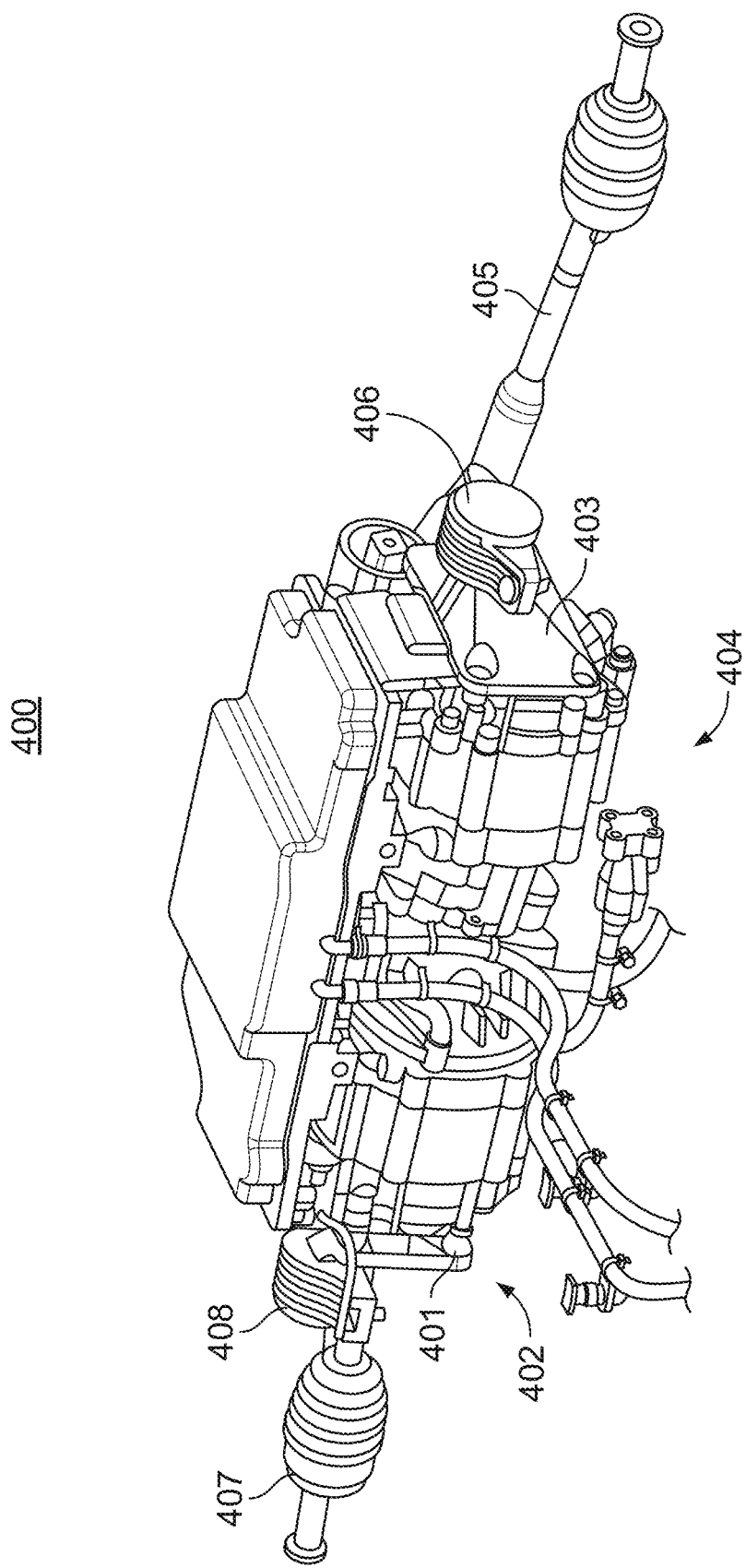
FIG. 4 is a detailed view of a dual electric motor axel in accordance with some embodiments of the present disclosure.

FIG. 4 is a detailed view of a dual electric motor axel 400, in accordance with some embodiments of the present disclosure. The illustrated dual-electric motor axel 400 may be positioned in the front of one or more vehicles 100, 200, and/or 300 and provide torque to front wheels 102 and 104, may be positioned in the rear of one or more vehicles 100, 200, and/or 300 and provide torque to rear wheels 106 and 108, or the dual-electric motor axel 400 may be positioned in both the front and the rear of one or more vehicles 100, 200, and/or 300 and provide torque to front wheels 102 and 104 and rear wheels 106 and 108. The dual-electric motor axel 400 includes two electric motors 402 and 404, gearboxes 401 and 403, axels 405 and 407, and resolvers 406 and 408. For example, in one configuration, with the dual-electric motor axel 400 positioned in the front of the vehicle 100, electric motor 402 may be coupled to a gearbox 401 and drive the front left wheel 102 (FIG. 1) through the axel 407 with the resolver 408 monitoring the wheel speed. However, this is only an example, and a single electric motor may drive multiple wheels.

Figure 5:
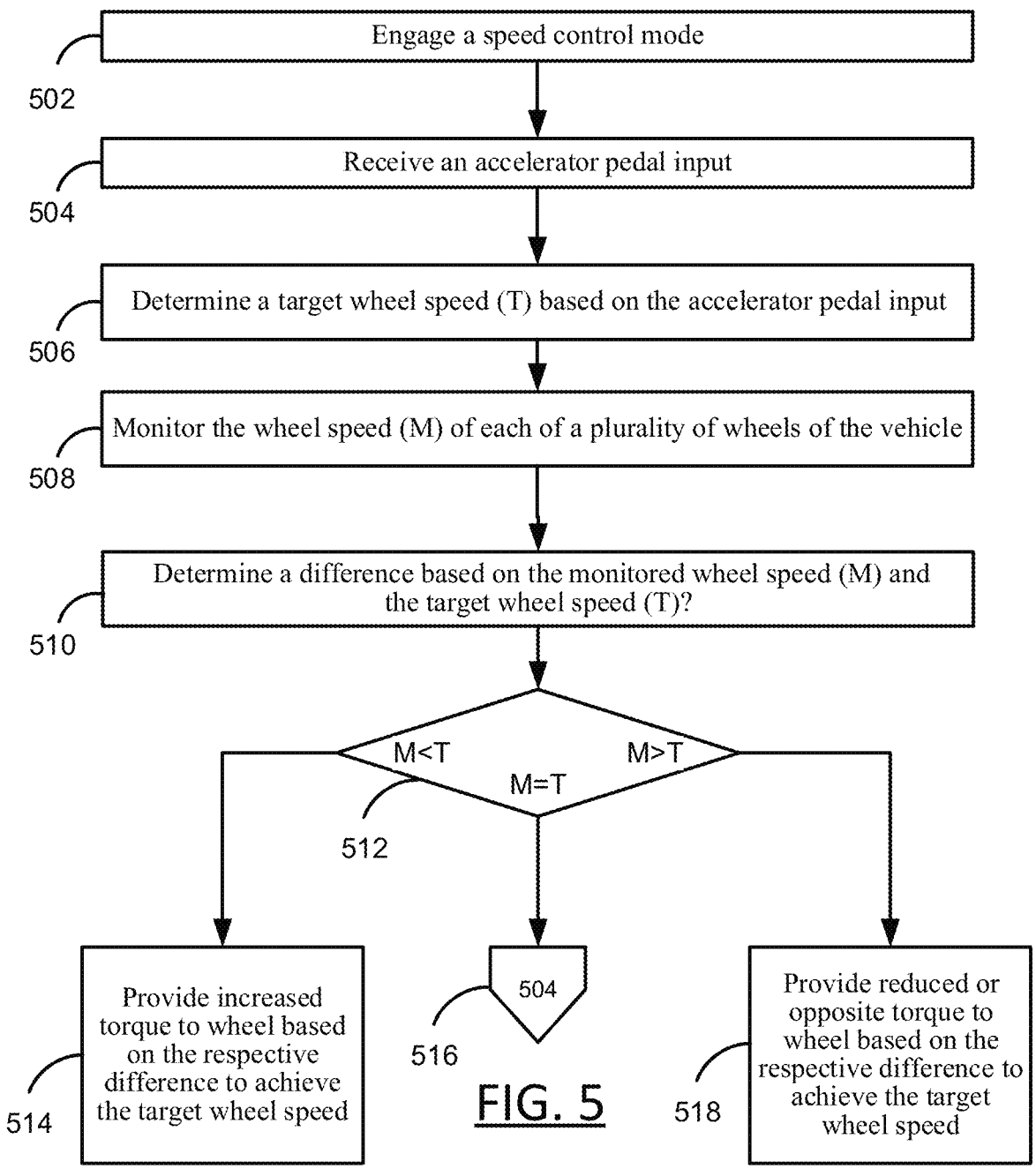
FIG. 5 depicts a flowchart of an illustrative process implementing speed control of wheels of a vehicle, in accordance with some embodiments of the present disclosure.

FIG. 5 depicts a flowchart of an illustrative process implementing speed control of wheels of a vehicle, in accordance with some embodiments of the present disclosure. In some embodiments, process 500 may be executed by processing circuitry 722 of system 700 (FIG. 7). It should be noted that process 500 or any step thereof could be performed on, or provided by, the system of FIG. 7.

Process 500 begins at 502, where the processing circuitry may receive input to engage speed control mode. For example, the processing circuitry may engage the speed control mode after the user issues a command requesting such mode (e.g., by pressing an appropriate button, a paddle shifter, via an input on a graphical user interface, or any other input). Yet, referring back to FIGS. 1-4, one or more vehicles 100, 200, and/or 300 may automatically engage in speed control mode based on sensor readings described herein, without any user inputs. The processing circuitry may determine whether one or more speed control mode initialization criteria are met. For example, whether a turn amount of the front wheels 102 and 104 of the vehicle 100 is satisfied. In some embodiments, the processing circuitry may use a sensor connected to a steering column to determine the turn angle of the wheels 102 and 104. In another example, obstacle avoidance sensors may monitor for any obstacles around vehicle 100 or in the vehicle's path. In some embodiments, the processing circuitry may engage the speed control mode after determining vehicle 100 is on an uneven surface 203 (e.g., climbing rocks, incline or decline) based on sensors in vehicle 100. For example, as vehicle 200 is climbing a rock and one of the wheels 208 becomes airborne, speed control mode is able to control the speed at which the wheel rotates.

In some embodiments, the processing circuitry may determine a gap between one or more wheels of the plurality of wheels and one or more ground surfaces (e.g., based on a pressure sensor or a calculated surface friction). For example, as vehicle 100 is traversing an uneven surface 203, the front left wheel 208 (FIG. 2) becomes airborne with a gap between front left wheel 208 and the uneven ground 203. In some embodiments, in response to determining a gap between front left wheel 208 and the uneven ground 203, the processing circuitry automatically engages a speed control mode without any user inputs.

Process 500 continues at 504, where the processing circuitry 722 may proceed depending on the outcome of step 502. For example, if the number of engagement criteria is satisfied, the processing circuitry may proceed to step 504. At 504, the processing circuitry may receive an accelerator pedal input from accelerator pedal 113. For example, the user may have pressed the accelerator pedal input 50%. The user may press the accelerator pedal input from a range of "0" zero (i.e., no accelerator pedal input) to 100% (i.e., pedal to the floor board). In some embodiments, the accelerator pedal input may be preprogramed and automatically provided a preset pedal input to the each of the motors.

In some embodiments, step 504 starts ramping up torque in an open-loop mode (i.e., without adjusting the torque based on monitoring any sensor data). For example, in the open-loop mode, the torque applied to each wheel ramps up regardless of the accelerator pedal input. Referring back to FIG. 1, for example, consider one or more motors 112, 114, 116, and 118 configured to provide and/or generate torque to one or more of the wheels 102, 104, 106, and 108, respectively. In this example, motors 114 and 118 may generate open-loop forward torque to wheels 104 and 108, respectively. Further, motors 112 and 116 may generate open-loop backward torque to wheels 102 and 106, respectively. In some embodiments, the left side of the vehicle including the front left wheel 102 and the rear left wheel 106 is a first side 150 of the vehicle 100 and the right side of the vehicle 100 including the front right wheel 104 and the rear right wheel 108 is a second side 160 of the vehicle 100. In some embodiments, the processing circuitry may provide the torque to each of the plurality of wheels to achieve the target wheel speed by providing an open-loop forward torque to wheels 102 and 106 on a first side 150 of the vehicle 100 and by providing an open-loop backward torque to wheels 104 and 108 on a second side 160 of the vehicle 100. For example, the processing circuitry may concurrently provide forward torque to wheels 102 and 106 on the first side 150 of the vehicle 100 and provide backward torque to wheels 104 and 108 on the second side 160 of the vehicle 100 (e.g., to perform vehicle yaw). In some embodiments, the second side 160 is opposite to the first side 150. For example, to perform smooth vehicle yaw, the vehicle 100 provides forward torque to wheels 102 and 106 on first side 150 of the vehicle 100 and backward torque to wheels 104 and 108 on the second side 160 of the vehicle 100.

In some embodiments, the processing circuitry 722 may provide the open loop torque to each of the plurality of wheels to achieve the wheel slippage. For example, providing an open-loop forward torque to wheels 102 and 106 on a first side 150 of the vehicle 100 by providing an open-loop backward torque to wheels 104 and 108 on a second side 160 of the vehicle 100. Upon a wheel slipping, the processing circuitry may engage a closed-loop mode, where the processing circuitry monitors the wheel speed. The torque is increased or decreased until the monitored wheel speed corresponds to the target wheel speed. In some embodiments, step 504 starts ramping up torque in a closed-loop mode where the amount of torque provided to the wheels is based on the amount the accelerator pedal is pressed. For example, in the closed-loop mode, the torque applied to each wheel is based on sensors monitoring vehicle outputs, e.g., wheel speed, regardless of the accelerator pedal input. For example, consider one or more motors 112, 114, 116, and 118 configured to provide and/or generate torque to one or more of the wheels 102, 104, 106, and 108, respectively based on the monitored wheel speed at each wheel. In this example, motors 114 and 118 may generate closed-loop forward torque to wheels 104 and 108, respectively. Further, motors 112 and 116 may generate closed-loop backward torque to wheels 102 and 106, respectively. For example, the amount of torque may be proportional to the amount the accelerator pedal is pressed or may be determined using a lookup table. In another example, the amount of torque may be based on a difference between the monitored wheel speed and the target wheel speed.

Process 500 continues at 506, where the processing circuitry may proceed depending on the outcome of step 504. For example, if the accelerator pedal input is received, the processing circuitry may proceed to step 506. At 506, the processing circuitry may determine a target wheel speed based on the accelerator pedal input. For example, in response to receiving an accelerator pedal input, the processing circuitry determines a target wheel speed based on how far the user pressed the accelerator pedal. In one embodiment, the target wheel speed is proportional to how far the user has pressed the accelerator pedal. For example, an accelerator pedal input of 25% is proportional to 25% of the maximum target speed. The range that the wheel may spin can be adjusted. In some embodiments, the range is set for a speed of 0-30 mph with the maximum target speed of 30 mph. In this example, an accelerator pedal input of 25% is proportional to 7.5 mph. In another example, an accelerator pedal input of 50% is proportional to 15 mph. In another embodiment, the target wheel speed is a user issued command requesting such target wheel speed (e.g., by pressing an appropriate button, a paddle shifter, via an input on a graphical user interface, or any other input). In an aspect of this embodiment, the target wheel speed may be adjusted with the appropriate button, a paddle shifter, or via an input on a graphical user interface. In this configuration, the amount the user has pressed the accelerator pedal does not correlate to the wheel speed.

At 508, the processing circuitry may monitor the wheel speed of each of a plurality of wheels of the vehicle. In some embodiments, the wheel speed is determined by one or more vehicle sensors (e.g., resolvers) configured to measure the rotation of the vehicle motors (e.g., at the motor shaft). The vehicle's sensors monitor the sensor signal of the motors to determine the wheel speed for each wheel and transmit this information to control circuitry. In another embodiment, the wheel speed is determined by one or more vehicle sensors configured to measure actual wheel speed (e.g., a sensor coupled to the axle). In some embodiments, the control circuitry may be communicatively connected to one or more sensors that provide data indicative of the wheel speed for each wheel of the vehicle. For example, sensors 712 of FIG. 7 may provide data indicative of wheel speed for each wheel 102, 104, 106, 108 of vehicle 100.

In some embodiments, process 500 continues at 510, where the processing circuitry 722 may determine, for each wheel, a difference based on the monitored wheel speed and the target wheel speed. In some embodiments, the processing circuitry may determine that monitored wheel speed is less than the target wheel speed, monitored wheel speed is approximately equal to the target wheel speed, or monitored wheel speed is greater than the target wheel speed. In some embodiments, process 500 continues at 512, where processing circuitry performs a decision tree. Specifically, based on monitored wheel speed (M) and target wheel speed (T), processing circuitry determines whether differences exists and provides torque to each wheel based on the respective differences.

In some embodiments, if the differences are zero ("0") (i.e., M=T) or if the differences are within a small number (e.g., ±1 mph), the process 500 continues at 516, by maintaining the torque applied to each wheel and going back to step 504, to receive the current accelerator pedal input from the user. For example, the accelerator pedal input may vary over time as the operator of the vehicle adjusts the pedal position.

In some embodiments, if the monitored wheel speed (M) is less than the target wheel speed (T) for a wheel at 512 (i.e., M<T), the process 500 continues at 514, to provide increased torque to the wheel based on the difference to achieve the target wheel speed. In some embodiments, the processing circuitry 722 may actuate any one of motors 112, 114, 116, and 118 to provide increased torque to corresponding wheel 102, 104, 106, or 108.

In some embodiments, if the monitored wheel speed (M) is greater than the target wheel speed (T) for a wheel at 512 (i.e., M>T), the process 500 continues at 518 to provide reduced or opposite torque to the wheel based on the difference to achieve the target wheel speed. In some embodiments, the processing circuitry 722 may actuate any one of motors 112, 114, 116, and 118 to provide reduced or opposite (i.e., opposite of the direction of the monitored wheel speed) torque to any one of wheels 102, 104, 106, and 108. In some embodiments, the processing circuitry applies mechanical braking to provide opposite torque to a wheel exceeding (e.g., greatly exceeding) the target wheel speed.

In some embodiments, the torque applied to each of the plurality of wheels based on the respective difference (irrespective of the difference being greater than or less than the target wheel speed), to achieve the target wheel speed, may be performed by a proportional-integral-derivative controller (PID controller). In some embodiments, the processing circuitry implements the PID controller and may continuously calculate a respective difference between the monitored wheel speed (M) and the target wheel speed (T) and apply torque based on proportional, integral, and derivative terms (denoted P, I, and D, respectively). For example, if only a small difference between the monitored wheel speed and target wheel speed is observed, change in the torque applied is proportionally small.

In some embodiments, the torque applied to each of the plurality of wheels based on the respective difference may be based on a threshold. In some embodiments, the processing circuitry 722 may determine a difference between the monitored wheel speed (M) and the target wheel speed (T) of greater than a first threshold (e.g., ±5 mph of target wheel speed), and in response, may provide a first torque (e.g., 50% torque) to each wheel with the difference to achieve the target speed. In some embodiments, the processing circuitry may determine a difference of greater than a second threshold (e.g., ±10 mph of target wheel speed). In response, the processing circuitry may provide a second torque (e.g., maximum torque) to each wheel with the difference to achieve the target speed.

It will be understood that process 500 is merely illustrative and various modifications can be made within the scope of the disclosure. For example, in some embodiments, steps 506, 508, and 510 can be omitted and step 512 can be performed in response to the accelerator pedal being pressed.

Figure 6:
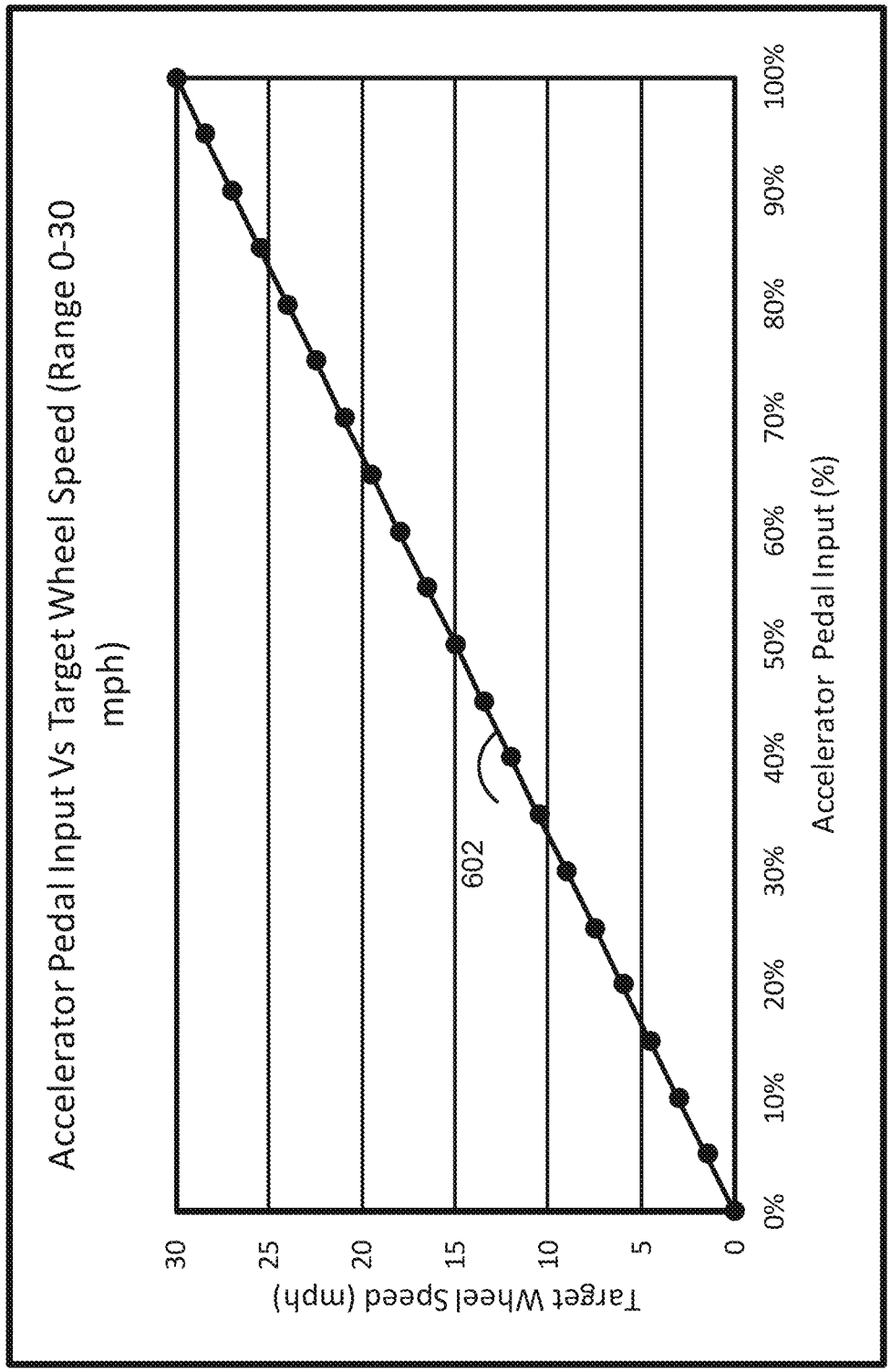
FIG. 6 shows a graph of an example of accelerator pedal input and target wheel speed for a speed control mode in accordance with some embodiments of the present disclosure.

FIG. 6 shows a graph of an example of accelerator pedal input and target wheel speed for a speed control mode in accordance with some embodiments of the present disclosure. In some embodiments, the graph data of FIG. 6 may be used by step 504 of FIG. 5 to determine a target wheel speed from the accelerator pedal input. In some embodiments, the range for the target wheel speed is adjusted based on the ground the vehicle is on. As shown in FIG. 6, the accelerator pedal input correlates proportionally to the target wheel speed. While the range for the target wheel speed may be adjusted, this example illustrates a range of 0-30 mph. Target wheel speed 602 shows the target wheel speed (e.g., in MPH) allowed based on accelerator pedal input, which is represented as a percentage along the x-axis of graph 600. For example, when an accelerator pedal input increases to 50%, target wheel speed increases to 15 mph, and the processing circuitry can adjust the torque to each wheel and/or apply braking to achieve the target wheel speed 602. Table 1 reproduced below, shows data represented on the graph. It should be noted that each of Table 1 and FIG. 6 is provided for example purposes and should not be interpreted as limiting the present disclosure, as various other relationships between the target wheel speed and the accelerator pedal input may be implemented, such as other linear, non-linear, and/or exponential relationships, among other variations contemplated herein.

TABLE 1

| Accelerator pedal input (%) | Target Wheel Speed (mph) |
| --- | --- |
| 0% | 0 |
| 5% | 1.5 |
| 10% | 3 |
| 15% | 4.5 |
| 20% | 6 |
| 25% | 7.5 |
| 30% | 9 |
| 35% | 10.5 |
| 40% | 12 |
| 45% | 13.5 |
| 50% | 15 |
| 55% | 16.5 |
| 60% | 18 |
| 65% | 19.5 |
| 70% | 21 |
| 75% | 22.5 |
| 80% | 24 |
| 85% | 25.5 |
| 90% | 27 |
| 95% | 28.5 |
| 100% | 30 |

FIG. 7 depicts a system diagram of an illustrative system 700 including control systems 701, input variables 702-706 and output variables 726-732, in accordance with several embodiments of the disclosure. As shown, the control systems 701 includes a communication interface 707, a processing circuitry 722, sensors 712-720 and motor and brake controller 724. The illustrative processing circuitry 722 includes processor 708 and memory 710. In an illustrative example, the control system 701 may be used for speed control of wheels of the vehicle (e.g., for better control on uneven and different friction surfaces when using two or more motors). In some embodiments, system 700 is incorporated into vehicle 100 of FIG. 1 to control the speed of wheels 102, 104, 106, and 108.

Processing circuitry 722 may include hardware, software, or both, implemented on one or more modules configured to provide control of front wheels 726 and 728 and rear wheels 730 and 732 of a vehicle. In some embodiments, processor 708 includes one or more microprocessors, microcontrollers, digital signal processors, programmable logic devices, field-programmable gate arrays (FPGAs), application-specific integrated circuits (ASICs), or any suitable combination thereof. In some embodiments, processor 708 is distributed across more than one processor or processing units. In some embodiments, processing circuitry 722 executes instructions stored in memory for managing a quad motor vehicle 100, or a triple motor vehicle (not shown) or a dual motor vehicle (not shown). In some embodiments, memory 710 is an electronic storage device that is part of processing circuitry 722. For example, memory 710 may be configured to store electronic data, computer instructions, applications, firmware, or any other suitable information. In some embodiments, memory 710 includes random-access memory, read-only memory, hard drives, optical drives, solid-state devices, or any other suitable memory storage devices, or any combination thereof. For example, memory may be used to launch a start-up routine. The communication interface 707 may include electrical terminals, level shifters, a communications module, connectors, cables, antennas, any other suitable components for transmitting and receiving information, or any combination thereof. For example, the communications interface 707 may include an Ethernet interface, a Wi-Fi interface, an optical interface, a sensor interface (e.g., for interacting with one or more sensors 712-721), any other suitable wired or wireless interface, or any combination thereof. To illustrate, the communication interface 707 may include a sensor interface having a power supply, analog-to-digital converter, digital-to-analog converter, signal processing equipment, signal conditioning equipment, connectors, electrical terminals, any other suitable components for managing signals to and from a sensor, or any combination thereof. To illustrate further, a sensor interface may be configured to communicate with the resolvers 712 (e.g., a rotary encoder coupled to the motor shaft or gear shaft), vehicle yaw sensor 714, orientation sensor 716, speed sensor 718, accelerometer sensor 720 (e.g., a vibration sensor), steering wheel angle sensor 721, any other suitable sensor or any combination thereof. In some embodiments, communications interface 707 is configured to transmit a control signal indicative of a motor command to each wheel 102, 104, 106, 108 of vehicle 100. In some embodiments, communication interface 707 is incorporated into processing circuitry 722, motor/brake controller 724, or both.

In some embodiments, the system may include resolvers 712, vehicle yaw sensor 714, orientation sensor 716, speed sensor 718, accelerometer sensor 720 and steering wheel angle sensor 721. In some embodiments, the control circuitry may be communicatively connected to resolvers 712 (e.g., a sensor) which may be coupled to a motor shaft of the motor (e.g., motor 112, 114, 116, 118 from FIG. 1). In some embodiments, the resolvers 712 may be a type of transformer/electromagnetic transducer that measures the degrees of rotation of the motor shaft 405. In some embodiments, resolvers 712 correspond to resolvers 406 and 408 of FIG. 4. For example, the resolvers 712 may be a type of rotary transformer including a cylindrical rotor and stator. Although a resolver is shown, any suitable sensor configured to measure the rotation of the motor shaft 405 (or other any other mechanically connected shaft or axle) may be used. In some embodiments, the control circuitry may be communicatively connected to one or more resolvers 712 that provide data indicative of the wheel rotation of each of front wheels 726 and 728 and rear wheels 730 and 732. In some embodiments, front wheels 726 and 728 and rear wheels 730 and 732 correspond to wheels 102, 104, 106, and 108 of the vehicle of FIG. 1. In some embodiments, based on the data provided by the resolvers, the control circuitry may determine if a wheel is slipping and monitor the wheel speed while in the speed control mode. In some embodiments, the control circuitry may be communicatively connected to one or more vehicle yaw sensors 714 that provide data indicative of the rotation of the vehicle. In some embodiments, the control circuitry may be communicatively connected to one or more orientation sensors 716 that provide data indicative of the orientation of vehicle 100 in 3D space. For example, orientation sensors 716 may provide data indicative of a pitch angle of vehicle 100, yaw angle of vehicle 100, and roll angle of vehicle 100. In some embodiments, the control circuitry may be communicatively connected to a speed sensor 718 that provides the current speed of vehicle 100. In some embodiments, the control circuitry may be communicatively connected to an accelerometer sensor 720 that provides the current acceleration of vehicle 100. In some embodiments, the control circuitry may be communicatively connected to a steering wheel angle sensor 721 that determines the wheel angle of the steerable wheels (e.g., 102 and 104) of vehicle 100. In some embodiments, in response to determining the wheel angle of the steering wheels with the steering wheel angle sensor 721, the control circuitry may turn the steerable wheels to reduce the wheel angle before initiating another driving mode. Examples of other driving modes include a vehicle yaw mode and a speed control mode. In some embodiments, the determined steering angles may be compared to a threshold angle (e.g., 10 degrees) before engaging vehicle yaw mode. In some embodiments, before engaging the vehicle yaw mode and in response to the determined wheel angle exceeds the threshold angle, the control circuitry may turn the steering wheel to reduce the wheel angle. In some embodiments, in response to engaging the vehicle yaw mode, the vehicle 100 may cause the wheels 102 and 104 of the vehicle to automatically straighten relative to a vertical axis 170 of the vehicle 100. In some embodiments, before engaging speed control mode, the control circuitry may determine whether the vehicle 100 is stopped or moving below a maximum vehicle speed (e.g., 10, 20, or 30 MPH).

Illustrative system 700 of FIG. 7 may be used to perform any or all of the illustrative steps of process 500 of FIG. 5. Illustrative system 700 of FIG. 7 may be used to control any of the wheel/motor configurations shown in FIG. 1, in accordance with the present disclosure. In some embodiments, not all components shown in FIG. 7 need to be included in system 700.

It is contemplated that the steps or descriptions of each of FIGS. 1-7 may be used with any other embodiment of this disclosure. One skilled in the art would appreciate that some steps or descriptions of each of FIGS. 1-6 may be optional and may be omitted in some embodiments. More generally, the above disclosure is meant to be exemplary and not limiting. In addition, the steps and descriptions described in relation to FIGS. 1-6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-4 could be used to perform one or more of the steps in FIG. 5.

It will be apparent to those of ordinary skill in the art that methods involved in the present disclosure may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. The processing circuitry, for instance, may be a general-purpose processor, a customized integrated circuit (e.g., an ASIC), or a field-programmable gate array (FPGA) within any vehicle 100.

The foregoing is merely illustrative of the principles of this disclosure and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A method for speed control of wheels of a vehicle, the method comprising:
applying an increasing torque to each of the wheels in an open-loop mode;
determining a target wheel speed for each of the wheels based on an accelerator pedal input;
identifying a slippage for one or more of the wheels; and
in response to the identifying the slippage for the one or more of the wheels, entering a closed-loop mode comprising:
monitoring wheel speed of each of the one or more of the wheels;
determining, for each of the one or more of the wheels, a difference based on the monitored wheel speed and the target wheel speed; and
adjusting a torque to each of the one of more of the wheels based on the respective difference to achieve the target wheel speed.

2. The method of claim 1, wherein one or more of the target wheel speeds cause the vehicle to make a zero radius turn.

3. The method of claim 1, wherein each respective motor comprises an electric motor and wherein the monitoring wheel speed of each of the one or more of the wheels, comprises:
monitoring signals from sensors coupled to motor shafts of the electric motors, wherein each sensor indicates an amount of rotation of a respective motor shaft; and
calculating each wheel speed based on a respective signal of the monitored signals.

4. The method of claim 1, wherein:
each of the wheels is connected to a respective motor configured to provide the respective torque;
each of the respective motors comprises an independent electric motor with a motor shaft; and
each of the motor shafts comprises a sensor, the method further comprising:
determining one or more signals from each of the sensors, wherein the monitoring wheel speed for each of the one or more of the wheels is based at least on the one or more signals.

5. The method of claim 1, wherein the difference for each of the one or more of the wheels based on the monitored wheel speed and the target wheel speed indicates the monitored wheel speed exceeds the target wheel speed, and wherein adjusting the torque to each of the one or more of the wheels comprises adjusting the torque in an opposite direction as each of the one or more of the wheels is spinning to reduce the monitored wheel speed.

6. The method of claim 1, wherein each of the wheels is connected to a respective motor configured to provide the respective torque with a reaction speed of less than 100 microseconds.

7. The method of claim 1, wherein the closed-loop mode further comprises:
detecting one or more declining surfaces associated with the wheels; and
determining a maximum wheel speed less than 30 miles per hour based on the one or more declining surfaces.

8. The method of claim 1, wherein the adjusting applying the increasing torque to each of the wheels in the open-loop mode comprises:
providing an open-loop forward torque to wheels on a first side of the vehicle; and
providing an open-loop backward torque to wheels on a second side of the vehicle,
wherein the first side is one of a left side and a right side of the vehicle, wherein the second side is one of the left side and the right side of the vehicle, and wherein the second side is opposite to the first side.

9. The method of claim 1, the method further comprising:
determining a gap between one or more of the wheels and one or more ground surfaces; and
automatically entering the closed-loop mode in response to the determining the gap.

10. The method of claim 1, wherein the wheels comprise four wheels and wherein the vehicle comprises four electric motors, each of the four electric motors configured to provide the torque to a respective one of the four wheels.

11. The method of claim 1, further comprising initiating a maximum wheel target speed in response to the identifying the slippage for the one or more of the wheels, the maximum wheel target speed being 30 miles per hour or less,
wherein the target wheel speed is proportional to an accelerator pedal input and wherein the maximum wheel target speed corresponds to a maximum accelerator pedal input.

12. The method of claim 11, wherein a range of 0-100% of the accelerator pedal input corresponds to a wheel target speed range of zero miles per hour to the maximum wheel target speed.

13. A system for speed control of wheels of a vehicle, the system comprising:
input circuitry configured to receive an accelerator pedal input; and
control circuitry configured to:
apply an increasing torque to each of the wheels in an open-loop mode based on the accelerator pedal input;
determine a target wheel speed for each of the wheels based on the accelerator pedal input;
identify a slippage for one or more of the wheels; and
in response to identifying the slippage for the one or more of the wheels, entering a closed-loop mode wherein the control circuitry is further configured to:
monitor wheel speed of each of the one or more of the wheels;
determine, for each of the one or more of the wheels, a difference based on the monitored wheel speed and the target wheel speed; and
adjust a torque to each of the one or more of the wheels based on the respective difference to achieve the target wheel speed.

14. The system of claim 13, wherein one or more of the target wheel speeds cause the vehicle to make a zero radius turn.

15. The system of claim 13, wherein each respective motor comprises an electric motor and wherein the control circuitry is configured to monitor wheel speed of each of the one or more of the wheels by:
monitoring signals from sensors coupled to motor shafts of the electric motors, wherein each sensor indicates an amount of rotation of a respective motor shaft, and
calculating each wheel speed based on a respective signal of the monitored signals.

16. The system of claim 13, wherein:
each of the wheels is connected to a respective motor configured to provide the respective torque;
each of the respective motors comprises an independent electric motor with a motor shaft; and
each of the motor shafts comprises a sensor, the control circuitry further configured to:
determine one or more signals from each of the sensors, wherein monitoring wheel speed for each of the one or more of the wheels is based at least on the one or more signals.

17. The system of claim 13, wherein the difference for each of the one or more of the wheels based on the monitored wheel speed and the target wheel speed indicates the monitored wheel speed exceeds the target wheel speed, and
wherein adjusting the torque to each of the one or more of the wheels comprises adjusting the torque in an opposite direction as each of the one or more of the wheels is spinning to reduce the monitored wheel speed.

18. The system of claim 13, wherein to apply the increasing torque to each of the wheels in the open-loop mode, the control circuitry is configured to:
provide an open-loop forward torque to wheels on a first side of the vehicle; and
provide an open-loop backward torque to wheels on a second side of the vehicle, and
wherein the first side is one of a left side and a right side of the vehicle, wherein the second side is one of the left side and the right side of the vehicle, and wherein the second side is opposite to the first side.

19. A vehicle comprising:
a plurality of electric motors, each comprising a motor shaft coupled to a respective one of a plurality of wheels of the vehicle;
an accelerator pedal configured to provide an accelerator pedal input;
power electronics configured to output power to each of the plurality of electric motors to generate a respective torque to a respective wheel;
a plurality of sensors, each configured to output a signal indicating a wheel speed of a corresponding wheel;
input circuitry configured to receive the accelerator pedal input and the signals of the plurality of sensors;
control circuitry configured to:
apply an increasing torque to each of the plurality of wheels in an open-loop mode based on the accelerator pedal input;
determine a target wheel speed for each of the plurality of wheels based on the accelerator pedal input;
identify a slippage for one or more of the plurality of wheels; and
in response to identifying the slippage for the one or more of the plurality of wheels, entering a closed-loop mode wherein the control circuitry is further configured to:
monitor, using the signals of the plurality of sensors, wheel speed of each of the one or more of the plurality of wheels;
determine, for each of the one or more of the plurality of wheels, a difference based on the monitored wheel speed and the target wheel speed; and
adjust the respective torque to be generated to each respective one of the one or more of the plurality of wheels based on the respective difference to achieve the target wheel speed.

* * * * *

UNITED STATES PATENT AND TRADEMARK OFFICE
CERTIFICATE OF CORRECTION

| | | |
|---|---|---|
| PATENT NO. | : 11,932,117 B2 | Page 1 of 1 |
| APPLICATION NO. | : 17/223403 | |
| DATED | : March 19, 2024 | |
| INVENTOR(S) | : Kang Wang et al. | |

It is certified that error appears in the above-identified patent and that said Letters Patent is hereby corrected as shown below:

In the Claims

In Claim 8, Column 20, Line 59, delete "adjusting".

Signed and Sealed this
Twenty-sixth Day of August, 2025

Coke Morgan Stewart
*Acting Director of the United States Patent and Trademark Office*